(12) United States Patent
Berkowitz et al.

(10) Patent No.: US 12,019,758 B2
(45) Date of Patent: Jun. 25, 2024

(54) INPUT VALIDATION USING MATHEMATICAL EXPRESSIONS

(71) Applicant: Intuit Inc., Mountain View, CA (US)

(72) Inventors: Yerucham Berkowitz, Givat Shmuel (IL); Eugene Zeiniss, Tel Aviv (IL); Dan Sharon, Kfar Saba (IL); Elad Shmidov, Kfar Saba (IL)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 17/978,193

(22) Filed: Oct. 31, 2022

(65) Prior Publication Data

US 2024/0143778 A1 May 2, 2024

(51) Int. Cl.
*G06F 21/57* (2013.01)
*G06F 40/30* (2020.01)

(52) U.S. Cl.
CPC ............ *G06F 21/577* (2013.01); *G06F 40/30* (2020.01)

(58) Field of Classification Search
CPC ................................ G06F 21/577; G06F 40/30
See application file for complete search history.

(56) References Cited

U.S. PATENT DOCUMENTS

| | | | | |
|---|---|---|---|---|
| 6,272,674 B1* | 8/2001 | Holiday, Jr. | ........ | G06F 9/44521 717/174 |
| 8,170,897 B1* | 5/2012 | Cohen | .............. | G06Q 10/06311 705/7.13 |
| 8,775,353 B2* | 7/2014 | Acquisti | ................ | G16H 10/60 706/47 |
| 2007/0214100 A1* | 9/2007 | Marfatia | ................ | G06N 5/022 706/20 |
| 2018/0004976 A1* | 1/2018 | Davis | ................... | G06F 21/6254 |
| 2019/0129765 A1* | 5/2019 | Dubodelov | ........... | G06F 21/629 |
| 2021/0174016 A1* | 6/2021 | Fox | ........................ | G06N 3/044 |
| 2023/0078607 A1* | 3/2023 | Fong | ...................... | G06F 21/62 726/26 |

OTHER PUBLICATIONS

Drools: "Drools 8.35.0 Final"; Mar. 3, 2023 (3 pages). https://www.drools.org/.
Uklimaschewski: "EvalEx—Java Expression Evaluator", Github, Inc., Feb. 12, 2023 (4 pages). https://github.com/uklimaschewski/EvalEx.
Wolframalpha: "Computational Intelligence"; Jul. 6, 2022, https://www.wolframalpha.com/ available at: https://web.archive.org/web/20220706224055/https://www.wolframalpha.com/.

* cited by examiner

*Primary Examiner* — Allen S Lin
*Assistant Examiner* — Tiffany Thuy Bui
(74) *Attorney, Agent, or Firm* — Lathrop GPM LLP

(57) ABSTRACT

A method implements input validation using mathematical expressions. The method includes receiving an input string, scanning the input string to locate a hit string matching a hit expression from a validation package, and converting the hit string to a list of values corresponding to characters from the hit string. The method further includes validating the hit string by evaluating a validation expression from the validation package using the list of values to generate a validation result and returning the validation result.

16 Claims, 4 Drawing Sheets

INPUT VALIDATION USING MATHEMATICAL EXPRESSIONS

BACKGROUND

User inputs are validated by systems to protect against sharing sensitive information. The validation may be done locally without accessing a web service to reduce the time needed or latency from using a web service. Validation algorithms may change and periodically updating the validation programs may open the system up to remote code execution vulnerabilities. A challenge is to validate user input locally with up to date validation algorithms.

SUMMARY

In general, in one or more aspects, the disclosure relates to a method implementing input validation using mathematical expressions. The method includes receiving an input string, scanning the input string to locate a hit string matching a hit expression from a validation package, and converting the hit string to a list of values corresponding to characters from the hit string. The method further includes validating the hit string by evaluating a validation expression from the validation package using the list of values to generate a validation result and returning the validation result.

In general, in one or more aspects, the disclosure relates to a system that includes a scan controller configured to locate a hit string, a validation controller configured to evaluate a validation expression, and an application executing on one or more servers. The application is configured for receiving an input string, scanning, with the scan controller, the input string to locate the hit string matching a hit expression from a validation package, and converting the hit string to a list of values corresponding to characters from the hit string. The application is further configured for validating, with the validation controller, the hit string by evaluating the validation expression from the validation package using the list of values to generate a validation result and returning the validation result.

In general, in one or more aspects, the disclosure relates to a method using input validation with mathematical expressions. The method includes transmitting a request and receiving a response to the request. The response is generated by receiving an input string; scanning, with the scan controller, the input string to locate the hit string matching a hit expression from a validation package; converting the hit string to a list of values corresponding to characters from the hit string; validating, with the validation controller, the hit string by evaluating the validation expression from the validation package using the list of values to generate a validation result; and obfuscating, in response to the validation result, the hit string in the input string to generate an updated string. The method further includes displaying the updated string without the hit string on a user device.

Other aspects of the invention will be apparent from the following description and the appended claims.

BRIEF DESCRIPTION OF DRAWINGS

Like elements in the various figures are denoted by like reference numerals for consistency.

DETAILED DESCRIPTION

In general, embodiments are directed to input validation using mathematical expressions. Mathematical expressions are used instead of executable code to distribute updated validation algorithms. In one embodiment, a validation algorithm is reduced to a mathematical expression that is stored as a text string. The mathematical expression (the text string) of an updated validation algorithm is distributed to client applications without distributing executable code for the updated validation algorithm. Distribution of validation algorithms using mathematical expressions encoded as text strings allows for local execution of the validation algorithm and prevents exposure to remote code execution exploits.

In one embodiment, the client application may be a chat service or chat bot that passes text messages between users. As an example, Catwoman needs help filling out forms and chats with Dr. Doom through a chat service hosted by Batman Corp. The chat service validates the inputs from Catwoman to identify and obfuscate sensitive information before the messages are passed along to Dr. Doom. The validation algorithms used by the chat service of Batman Corp are periodically updated by receiving validation packages from a validation expression service. The validation package includes validation expressions for updated validation algorithms without executable to prevent remote code execution attacks on the servers of Batman Corp.

The figures of the disclosure show diagrams of embodiments that are in accordance with the disclosure. The embodiments of the figures may be combined and may include or be included within the features and embodiments described in the other figures of the application. The features and elements of the figures are, individually and as a combination, improvements to the technology of input validation and distribution. The various elements, systems, components, and steps shown in the figures may be omitted, repeated, combined, and/or altered as shown from the figures. Accordingly, the scope of the present disclosure should not be considered limited to the specific arrangements shown in the figures.

Figure 1:
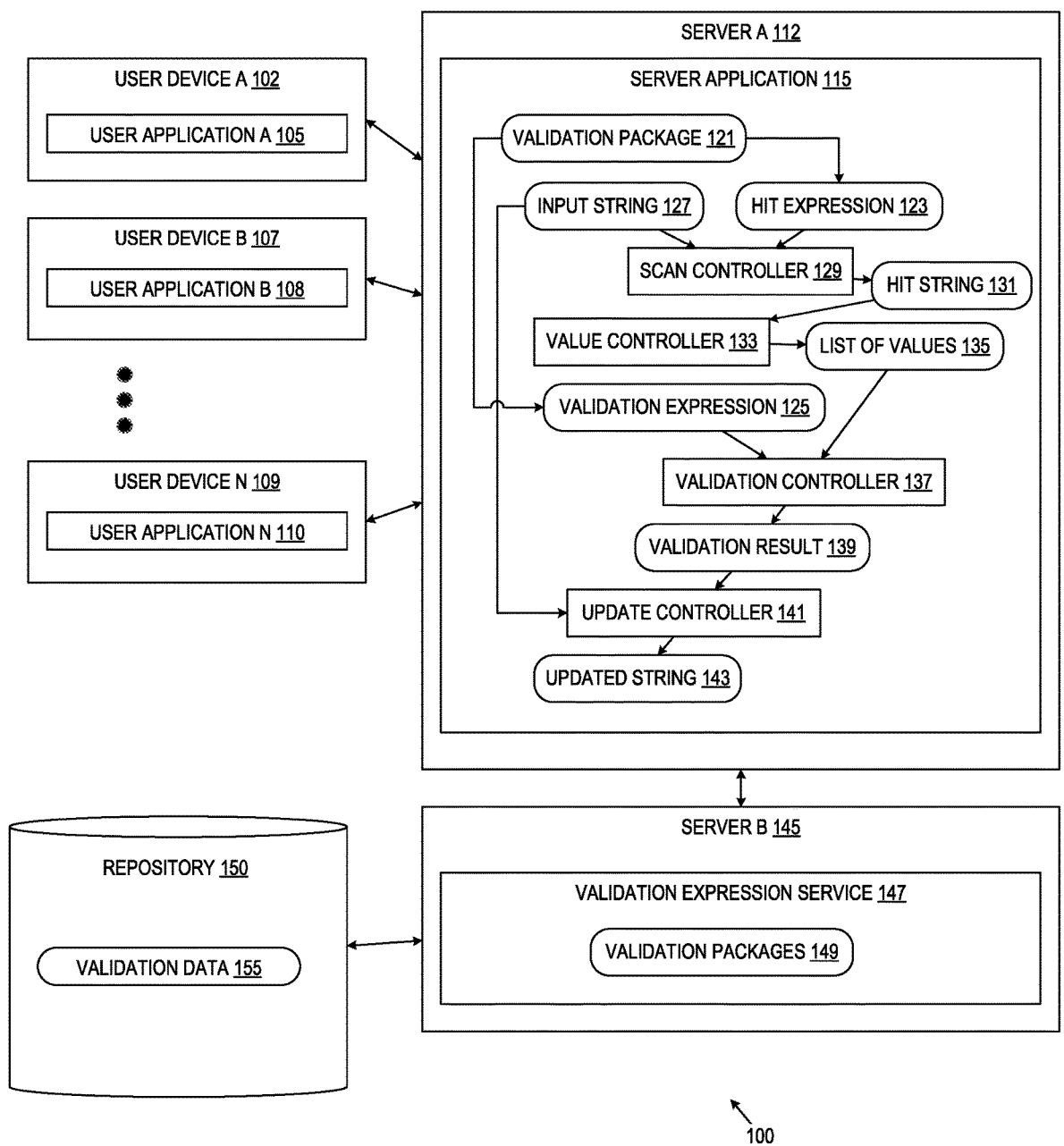
FIG. 1 shows a diagram of a system in accordance with disclosed embodiments.

Turning to FIG. 1, the system (100) validates inputs using mathematical expressions that are not distributed as executable code. The system (100) processes the input string (127) to generate the updated string (143) using the validation expression (125) from the validation package (121). The system (100) includes the server A (112), the server B (145), the user devices A (102) and B (107) through N (109), and the repository (150).

Figure 4A:
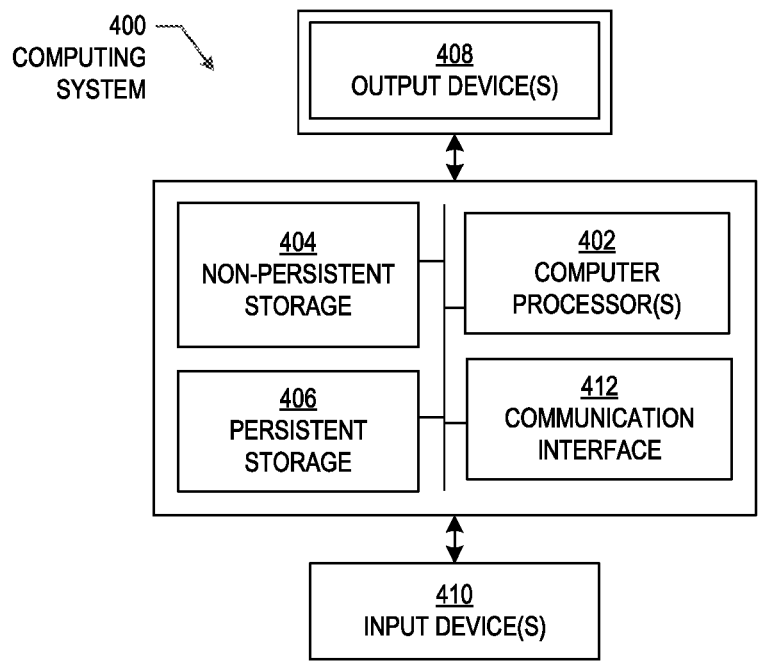
FIG. 4A and FIG. 4B show computing systems in accordance with disclosed embodiments.

The server A (112) is a computing system (further described in FIG. 4A). The server A (112) may include multiple physical and virtual computing systems that form part of a cloud computing environment. In one embodiment, execution of the programs and applications of the server A (112) is distributed to multiple physical and virtual computing systems in the cloud computing environment. The server A (112) includes the server application (115).

The server application (115) is a collection of programs that may execute on multiple servers of a cloud environment, including the server A (112). The server application (115) processes the input string (127) to generate the updated string (143) using the hit expression (123) and the validation expression (125) from the validation package (121). In one embodiment, the server application (115) hosts websites and services using structured documents (hypertext markup language (HTML) pages, extensible markup language (XML) pages, JavaScript object notation (JSON) files and messages, etc.) to interact with the user devices A (102) and B (107) through N (109). The server application (115) includes the scan controller (129), the value controller (133), the validation controller (137), and the update controller (141).

The validation package (121) is a collection of data that is one of the validation packages (149). The validation package (121) includes the hit expression (123) and the validation expression (125) for a validation algorithm. In one embodiment, the validation package (121) is received as part of a periodic update from the validation expression service (147).

The hit expression (123) is a collection of data that identifies the hit string (131) within the input string (127). In one embodiment, the hit expression (123) is text string with a sequence of characters that define a search pattern for recognizing portions of input strings that may include sensitive information. In one embodiment, the hit expression (123) is a regular expression (regex). As an example, the hit expression (123) may include the regular expression "[0-9]{9}", which matches to a contiguous sequence of nine juxtaposed digits.

The validation expression (125) is a collection of data that defines a mathematical expression for validating whether a string (e.g., the hit string (131) includes sensitive information. In one embodiment, the validation expression (125) is a text string including a sequence of characters. The validation expression (125) may be in accordance with a standard, including LaTex, AsciiMath, MathSON, MathJSON, etc. As an example, the validation expression (125) may include the validation string "(x[0] *1+x[1] *4+x[2] *3+x[3] *7+x[4] *5+x[5] *8+x[6] *6+x[7] *9+x[8] *10) % 11=0", which may be used to determine if a number is a valid Australian Tax File Number. In one embodiment, the validation string includes the substrings "x[0]", "x[1]", . . . , which correspond to items in the list of values (135), which correspond to characters from the input string (127). A valid Australian Tax File Number includes nine digits with the weighted sum of the nine digits being a multiple of 11 with the weights being 1, 4, 3, 7, 5, 8, 6, 9, and 10.

The input string (127) is a string of text. The input string (127) is received from one of the user devices A (102) and B (107) through N (109). The input string (127) may be part of a chat service message between two or more of the user devices A (102) and B (107) through N (109).

The scan controller (129) is a collection of hardware and software components with instructions that process the input string (127) using the hit expression (123) to generate the hit string (131). In one embodiment, the scan controller (129) may be a regular expression processor that processes the input string (127) with the regular expression defined by the hit expression (123).

The hit string (131) is a substring of the input string (127) generated by the scan controller (129). The hit string (131) may contain sensitive information. For example, the hit string (131) may include the string "876543210".

The value controller (133) is a collection of hardware and software components with instructions to process the hit string (131) to generate the list of values (135). In one embodiment, the value controller (133) splits the hit string (131) into multiple characters, which are then converted to numeric values. E.g., the string "876543210" may be converted to nine numeric values "8", "7", "6", "5", "4", "3", "2", "1", and "0". Different types of splits and conversions, as well as different data and data types, may be used.

The list of values (135) are the values generated from the hit string (131). In one embodiment, the list of values (135) is a list of numeric values that correspond to the characters of the hit expression (123).

The validation controller (137) is a collection of hardware and software components with instructions to process the list of values (135) with the validation expression (125) to generate the validation result (139). The validation controller (137) performs the mathematical operations specified in the validation expression (125) using the data from the list of values (135). Continuing the examples from above, the mathematical expression defined by the string $$(x[0]*1+x[1]*4+x[2]*3+x[3]*7+x[4]*5+x[5]*8+x[6]*6+x[7]*9+x[8]*10)\% \ 11=0"$$

is evaluated with the numeric values "8", "7", "6", "5", "49", "3", "2", "1", and "0". Substituting the numeric values into the mathematical expression yields the substituted expression:

$$(8*1+7*4+6*3+5*7+4*5+3*8+2*6+1*9+0*10) \%11=0$$

Simplifying the substituted expression yields the simplified expression:

$$(8+28+18+35+20+24+12+9+0)\%11=0$$

Further simplification yields:

$$154\%11=0$$

Further simplification yields:

$$0=0$$

Since the expression above is a true statement, the validation would pass for this example.

The validation result (139) is a collection of data that identifies the outcome of the validation of the hit string (131) with the validation expression (125). From the example above, the expression simplifies to a true statement and the validation result (139) may indicate that the validation was successful. The validation result (139) may use string values, numeric values, categorical values, etc., to identify the result.

The update controller (141) is a collection of hardware and software components with instructions to process the input string (127) based on the validation result (139) to generate the updated string (143). In one embodiment, when the validation result (139) indicates that the validation was successful, the update controller (141) may obfuscate the portion of the input string (127) that corresponds to the hit string (131). In one embodiment, the obfuscation may be performed by replacing characters in the input string (127) that correspond to the characters in the hit string (131) with the character "X".

The updated string (143) is a collection of data generated from the input string (127). When the updated string (143) includes sensitive data, the system (100) may obfuscate the sensitive data within the updated string (143). For a chat service, the updated string (143) may be transmitted to a recipient instead of the input string (127) to prevent sensitive data from being shared.

The server B (145) is a computing system (further described in FIG. 4A). The server B (145) may include multiple physical and virtual computing systems that form part of a cloud computing environment. In one embodiment, execution of the programs and applications of the server B (145) is distributed to multiple physical and virtual computing systems in the cloud computing environment. The server B (145) includes the validation expression service (147).

The validation expression service (147) is a collection of programs that may execute on multiple servers of a cloud environment, including the server B (145). The validation expression service (147) distributes the validation packages (149) (including the validation package (121)) to other applications executing as part of the system (100). Different applications may use different validation algorithms and receive different packages from the validation packages (149).

Continuing with FIG. 1, the user devices A (102) and B (107) through N (109) are computing systems (further described in FIG. 4A). For example, the user devices A (102) and B (107) through N (109) may be desktop computers, mobile devices, laptop computers, tablet computers, server computers, etc. The user devices A (102) and B (107) through N (109) include hardware components and software components that operate as part of the system (100). The user devices A (102) and B (107) through N (109) communicate with the server A (112) to access, manipulate, and view services and information hosted by the system (100). The user devices A (102) and B (107) through N (109) may communicate with the server A (112) using standard protocols and file types, which may include hypertext transfer protocol (HTTP), HTTP secure (HTTPS), transmission control protocol (TCP), internet protocol (IP), hypertext markup language (HTML), extensible markup language (XML), etc. The user devices A (102) and B (107) through N (109) respectively include the user applications A (105) and B (108) through N (110).

The user applications A (105) and B (108) through N (110) may each include multiple programs respectively running on the user devices A (102) and B (107) through N (109). The user applications A (105) and B (108) through N (110) may be native applications, web applications, embedded applications, etc. In one embodiment, the user applications A (105) and B (108) through N (110) include web browser programs that display web pages from the server A (112).

As an example, the user application A (105) may be used by Catwoman to communicate with Dr. Doom, who is using the user application B (108). Catwoman generates the input string (127), which is processed by the server application (115) to generate the updated string (143). The updated string (143) may be transmitted to the user device B (107) and displayed to Dr. Doom.

Figure 4B:
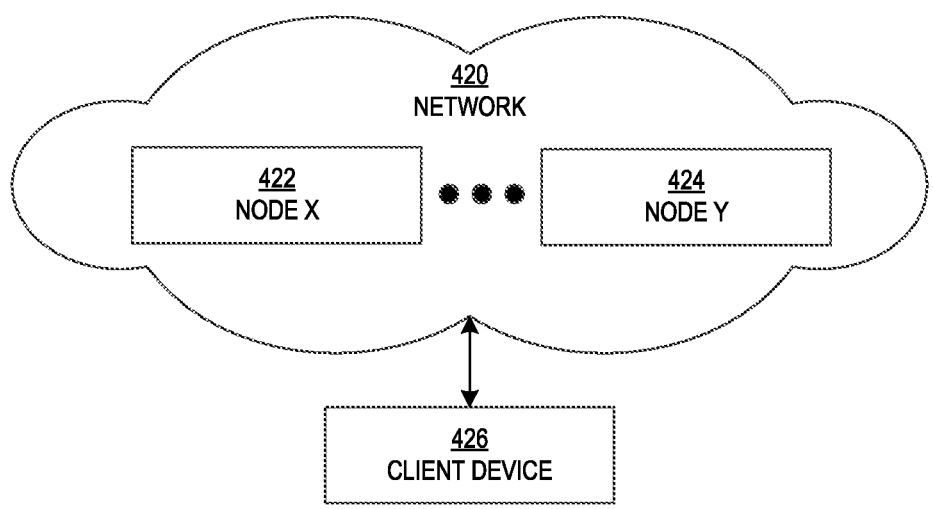

The repository (150) is a computing system that may include multiple computing devices in accordance with the computing system (400) and the nodes (422) and (424) described below in FIGS. 4A and 4B. The repository (150) may be hosted by a cloud services provider that also hosts the server A (112). The cloud services provider may provide hosting, virtualization, and data storage services as well as other cloud services to operate and control the data, programs, and applications that store and retrieve data from the repository (150). The data in the repository (150) includes the validation data (155).

The validation data (155) is a collection of data that includes the validation packages (149) and the validation package (121). The validation data (155) may include historical versions of the validation data, including historical versions of validation expressions and hit expressions. Updates to the validation data (155) may trigger distribution of the validation package (121) to the server application (115) from the validation packages (149) by the validation expression service (147).

Although shown using distributed computing architectures and systems, other architectures and systems may be used. In one embodiment, the server application (115) may be part of a monolithic application that implements the modeling and management of affinity networks. In one embodiment, the user applications A (105) and B (108) through N (110) may be part of monolithic applications that implement and use affinity networks without the server application (115).

Figure 2:
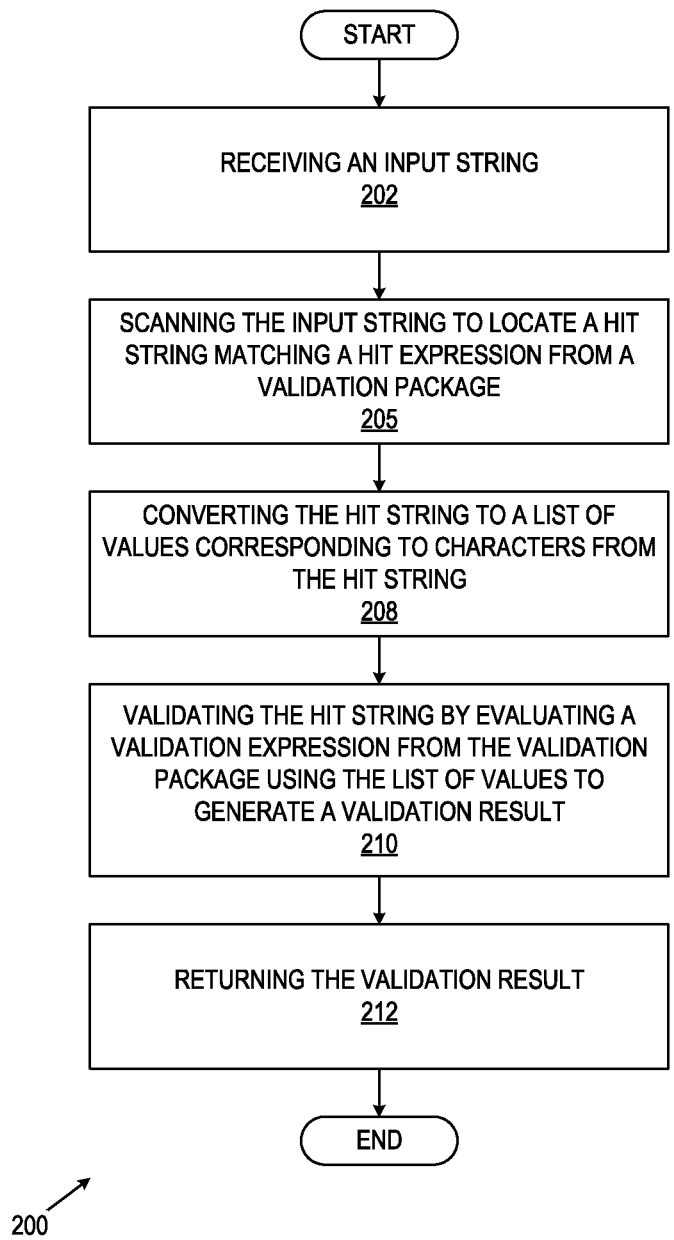
FIG. 2 shows a flowchart in accordance with disclosed embodiments.

Turning to FIG. 2, the process (200) validates inputs using mathematical expression. The process (200) may be performed by a server interacting with one or more user devices.

At Step 202, an input string is received. In one embodiment, the input string may be received as part of a chat interface. In one embodiment, the chat interface may be between a user and a chatbot. In one embodiment, the chat interface may be between a user and an expert. In one embodiment, the input string may be received as part of a chat session that was initiated in response to a chat request from a user device.

At Step 205, the input string is scanned to locate a hit string matching a hit expression from a validation package. In one embodiment, the hit string includes sensitive information and the hit expression is a search expression that identifies hit strings within text. In one embodiment, the hit expression is a regular expression.

In one embodiment, the hit expression is part of a validation package that is part of a set of packages requested from a server. The packages may be requested periodically.

In one embodiment, a plurality of detector classes corresponding to the set of packages is initialized. The detector classes include machine executable instructions for detecting the hit strings within input strings. Each different type of sensitive information may have a detector class distributed by a validation package containing a hit expression and a validation expression.

At Step 208, the hit string is converted to a list of values corresponding to characters from the hit string. In one embodiment, the values are numeric values with one value for each character from the expression/character string.

In one embodiment, the hit string is extracted from the input string prior to converting the hit string to the list of values. In one embodiment, extraction may clean up the hit string. For example, the extraction may removing separator characters (e.g., dashes, commas, etc.).

In one embodiment, converting the hit string includes splitting the hit string to a list of characters. In one embodiment, the list of characters may include an item for each character from the hit string. In one embodiment, the list of characters may include an item for groups of characters separated by separator characters in the hit string.

In one embodiment, the list of characters is converted to the list of values, in which a value of the list of values is a numeric value corresponding to a character of the list of characters. For example, a character representing a the number "1" may be converted to a real number "1" (e.g., an integer or floating point value) in the list of values.

At Step 210, the hit string is validated by evaluating a validation expression from the validation package using the list of values to generate a validation result. In one embodiment, the validation expression is a mathematical expression stored as a string. In one embodiment, the validation expression is stored as a validation string. In one embodiment, the validation string includes a set of substrings. In one embodiment, the set of substrings correspond to the list of values. In one embodiment, the validation expression includes a mathematical expression defining a mathematical combination of the list of values. In one embodiment, the validation expression is evaluated by substituting a substring, of the set of substrings of the validation expression, with a value of the list of values.

At Step 212, the validation result is returned. In one embodiment, the validation result is returned to the process that transmitted the input string. In one embodiment, the validation result may be a numeric value mapped to the result. A value of "0" may indication that the validation succeeded. A value other than "0" may indicate that the validation did not succeed. In one embodiment, a value other than "0" may be mapped to an error code with a textual description that describes a reason that the validation did not succeed.

In one embodiment, in response to the validation result, the hit string in the input string is obfuscated to generate an updated string. The obfuscation may be performed by substituting the characters of the hit string in the input string with nonce characters (e.g., "x") or with random values. In one embodiment, the updated string is displayed without the hit string on a user device. The updated string may be transmitted to a user device in lieu of the input string to prevent the user device from displaying sensitive information.

Figure 3:
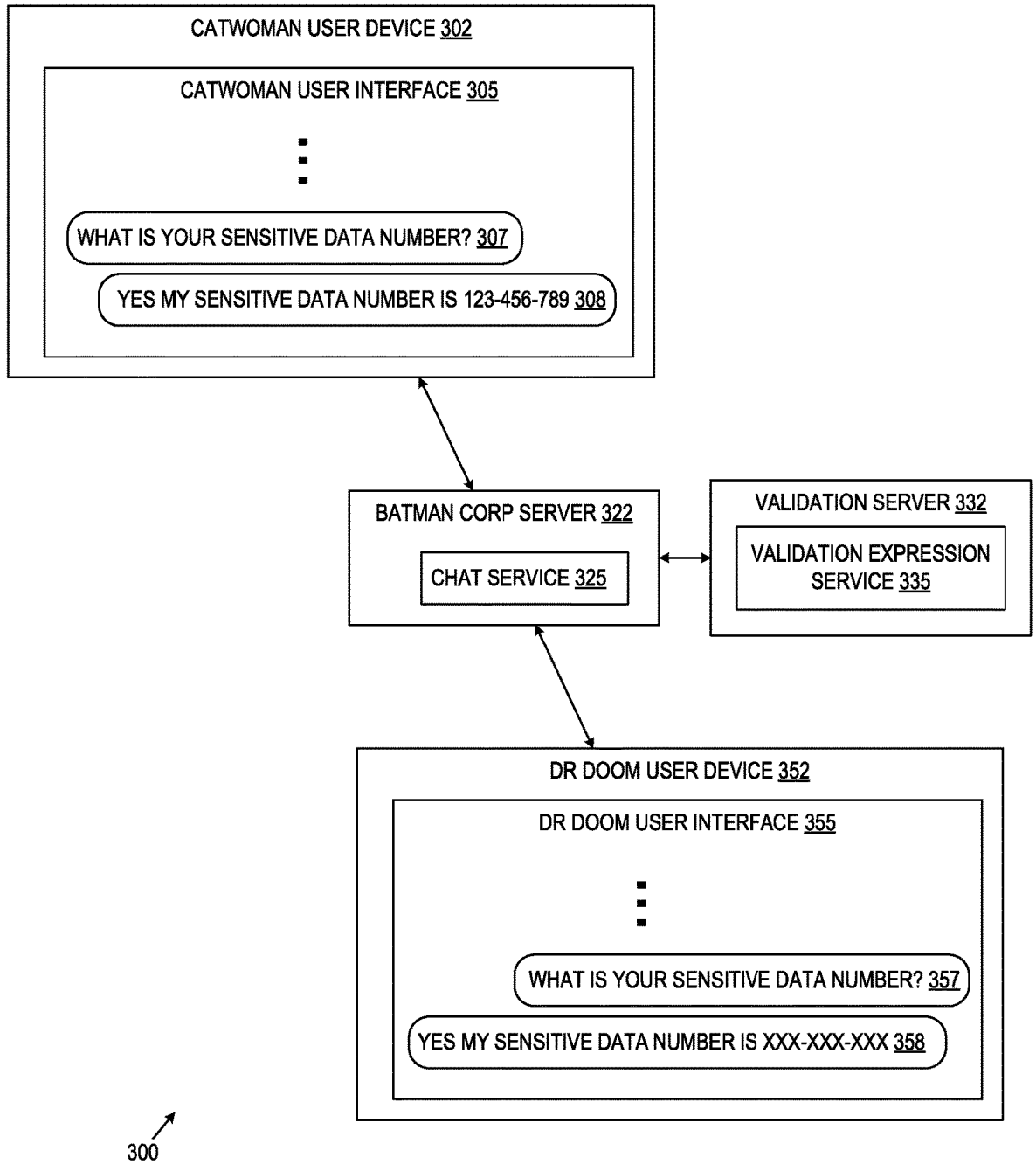
FIG. 3 shows an example in accordance with disclosed embodiments.

FIG. 3 shows an example with the system (300) using input validations with mathematical expressions. Catwoman is attempting to fill out some forms on a website but feels that she needs the help of an expert in order to prevent the ire of the Internal Revenue Service (IRS). Additionally, after being foiled by the Fantastic Four "for the last time", Dr. Doom, who did not become a doctor without becoming an expert in filling out forms, has decided to turn over a new leaf and help others with filling out forms.

Catwoman operates the Catwoman user device (302) to set up a chat through the chat service (325) with an expert. The Catwoman user device (302) includes the Catwoman user interface (305), which displays live messages during the chat. The Catwoman user device (302) receives the message (307). Catwoman implicitly trusts Batman Corp and replies with the message (308).

The Batman Corp server (322) operates the chat service (325) and receives the message (308) from the Catwoman user device (302). The chat service (325) uses the validation expression service (335) to stay up to date with the latest validation expressions.

The validation expression service (335) executes on the validation server (332). Periodically, the validation server (332) receives requests for updates from the Batman Corp server (322) and responds with the latest validation packages. One of the validation packages includes a validation expression and hit expression for sensitive information.

After receiving the message (308), the chat service (325) processes the message (308) as an input string. One of the validation packages from the validation expression service (335) includes a hit expression that identifies "123-456-789" as a hit string. The Batman Corp server (322) generates a list of values from the hit string and evaluates the validation expression using the list of values. The validation result identifies that the hit string is sensitive information. The chat service (325) obfuscates the hit string from the message (308) to generate an updated string that is transmitted to the Dr. Doom user device (352).

The Dr. Doom user device (352) is used by Dr. Doom so that he can help others in response to chatting with them. The Dr. Doom user device (352) includes the Dr. Doom user interface (355), which displays live message during the chat.

In a moment of weakness, Dr. Doom gives in to old habits and asks Catwoman for sensitive information and sends the message (357) (displayed as the message (307) by the Catwoman user device (302)). In response, Dr. Doom sees the message (358) displayed on the Dr. Doom user device (352), in which the sensitive information ("123-456-789" from the message (308)) has been obfuscated as "XXX-XXX-XXX" and realizes that he has been "foiled again".

Embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 4A, the computing system (400) may include one or more computer processors (402), non-persistent storage (404), persistent storage (406), a communication interface (412) (e.g., Bluetooth interface, infrared interface, network interface, optical interface, etc.), and numerous other elements and functionalities that implement the features and elements of the disclosure. The computer processor(s) (402) may be an integrated circuit for processing instructions. The computer processor(s) may be one or more cores or micro-cores of a processor. The computer processor(s) (402) includes one or more processors. The one or more processors may include a central processing unit (CPU), a graphics processing unit (GPU), a tensor processing units (TPU), combinations thereof, etc.

The input devices (410) may include a touchscreen, keyboard, mouse, microphone, touchpad, electronic pen, or any other type of input device. The input devices (410) may receive inputs from a user that are responsive to data and messages presented by the output devices (408). The inputs may include text input, audio input, video input, etc., which may be processed and transmitted by the computing system (400) in accordance with the disclosure. The communication interface (412) may include an integrated circuit for connecting the computing system (400) to a network (not shown) (e.g., a local area network (LAN), a wide area network (WAN) such as the Internet, mobile network, or any other type of network) and/or to another device, such as another computing device.

Further, the output devices (408) may include a display device, a printer, external storage, or any other output device. One or more of the output devices may be the same or different from the input device(s). The input and output device(s) may be locally or remotely connected to the computer processor(s) (402). Many different types of computing systems exist, and the aforementioned input and output device(s) may take other forms. The output devices (408) may display data and messages that are transmitted and received by the computing system (400). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention, which may include transmitting, receiving, presenting, and displaying data and messages described in the other figures of the disclosure.

The computing system (400) in FIG. 4A may be connected to or be a part of a network. For example, as shown in FIG. 4B, the network (420) may include multiple nodes (e.g., node X (422), node Y (424)). Each node may correspond to a computing system, such as the computing system shown in FIG. 4A, or a group of nodes combined may correspond to the computing system shown in FIG. 4A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (400) may be located at a remote location and connected to the other elements over a network.

The nodes (e.g., node X (422), node Y (424)) in the network (420) may be configured to provide services for a client device (426), including receiving requests and transmitting responses to the client device (426). For example, the nodes may be part of a cloud computing system. The client device (426) may be a computing system, such as the computing system shown in FIG. 4A. Further, the client device (426) may include and/or perform all or a portion of one or more embodiments of the invention.

The computing system of FIG. 4A may include functionality to present raw and/or processed data, such as results of comparisons and other processing. For example, presenting data may be accomplished through various presenting methods. Specifically, data may be presented by being displayed in a user interface, transmitted to a different computing system, and stored. The user interface may include a GUI that displays information on a display device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be temporary, permanent, or semi-permanent communication channel between two entities.

The various descriptions of the figures may be combined and may include or be included within the features described in the other figures of the application. The various elements, systems, components, and steps shown in the figures may be omitted, repeated, combined, and/or altered as shown from the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, or is an "inclusive or" and, as such includes "and." Further, items joined by an or may include any combination of the items with any number of each item unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method comprising:
    requesting a set of packages from a server, wherein the set of packages comprises a validation package;
    receiving an input string;
    scanning the input string to locate a hit string matching a hit expression from the validation package;
    converting the hit string to a list of values corresponding to characters from the hit string, wherein the converting comprises;
        splitting the hit string to a list of characters; and
        converting the list of characters to the list of values, wherein a value of the list of values is a numeric value corresponding to a character of the list of characters;
    validating the hit string by evaluating a validation expression from the validation package using the list of values to generate a validation result, wherein the validation expression comprises a mathematical expression defining a mathematical combination of the list of values; and
    returning the validation result;
    initializing a plurality of detector classes corresponding to a set of packages.

2. The method of claim 1, further comprising:
    obfuscating, in response to the validation result, the hit string in the input string to generate an updated string.

3. The method of claim 1, further comprising:
    obfuscating the hit string in the input string to generate an updated string, wherein the updated string is displayed without the hit string on a user device.

4. The method of claim 1, further comprising:
    scanning the input string with the hit expression, wherein the hit expression is a regular expression.

5. The method of claim 1, further comprising:
    extracting the hit string from the input string prior to converting the hit string to the list of values.

6. The method of claim 1, further comprising:
    initializing a plurality of detector classes corresponding to a set of packages.

7. The method of claim 1, further comprising:
    evaluating the validation expression,
        wherein the validation expression is stored as a validation string,
        wherein the validation string comprises a set of substrings,
        wherein the set of substrings correspond to the list of values, and wherein the mathematical expression identifies a valid result for an evaluation of the mathematical combination.

8. The method of claim 1, further comprising:
evaluating the validation expression by substituting a substring, of a set of substrings of the validation expression, with a value of the list of values.

9. A system comprising:
one or more hardware servers;
an application, executing on the one or more hardware servers, comprising:
  a scan controller configured to locate a hit string; and
  a validation controller configured to evaluate a validation expression,
wherein the application is configured for:
  requesting a set of packages from a server, wherein the set of packages comprises a validation package;
  receiving an input string;
  scanning, with the scan controller, the input string to locate the hit string matching a hit expression from the validation package;
  converting the hit string to a list of values corresponding to characters from the hit string, wherein the converting comprises;
    splitting the hit string to a list of characters; and
    converting the list of characters to the list of values, wherein a value of the list of values is a numeric value corresponding to a character of the list of characters;
  validating, with the validation controller, the hit string by evaluating a validation expression from the validation package using the list of values to generate a validation result, wherein the validation expression comprises a mathematical expression defining a mathematical combination of the list of values; and
  returning the validation result.

10. The system of claim 9, wherein the application is further configured for:
obfuscating, in response to the validation result, the hit string in the input string to generate an updated string.

11. The system of claim 9, wherein the application is further configured for:
obfuscating the hit string in the input string to generate an updated string, wherein the updated string is displayed without the hit string on a user device.

12. The system of claim 9, wherein the application is further configured for:
scanning the input string with the hit expression, wherein the hit expression is a regular expression.

13. The system of claim 9, wherein the application is further configured for:
extracting the hit string from the input string prior to converting the hit string to the list of values.

14. The system of claim 9, wherein the application is further configured for:
initializing a plurality of detector classes corresponding to a set of packages.

15. The system of claim 9, wherein the application is further configured for:
evaluating a validation expression,
evaluating the validation expression,
  wherein the validation expression is stored as a validation string,
  wherein the validation string comprises a set of substrings,
  wherein the set of substrings correspond to the list of values, and
  wherein the mathematical expression identifies a valid result for an evaluation of the mathematical combination.

16. A method comprising:
transmitting a request;
receiving a response to the request, wherein the response is generated by:
  receiving an input string;
  scanning the input string to locate a hit string matching a hit expression from a validation package;
  converting the hit string to a list of values corresponding to characters from the hit string, wherein the converting comprises;
    splitting the hit string to a list of characters; and
    converting the list of characters to the list of values, wherein a value of the list of values is a numeric value corresponding to a character of the list of characters;
  validating, with the hit string by evaluating a validation expression from the validation package using the list of values to generate a validation result, wherein the validation expression comprises a mathematical expression defining a mathematical combination of the list of values; and
  obfuscating, in response to the validation result, the hit string in the input string to generate an updated string; and
displaying the updated string without the hit string on a user device.

* * * * *